United States Patent [19]

Clegg

[11] Patent Number: 4,492,438

[45] Date of Patent: Jan. 8, 1985

[54] CONICAL WIDE-FIELD MICROSCOPIC LENS

[76] Inventor: John E. Clegg, 2320 Keystone Dr., Orlando, Fla. 32806

[21] Appl. No.: 350,242

[22] Filed: Feb. 19, 1982

[51] Int. Cl.³ .................. G02B 13/08; G02B 21/00
[52] U.S. Cl. .................................. 350/432; 350/414
[58] Field of Search ............................... 350/432, 414

[56] References Cited

U.S. PATENT DOCUMENTS

| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Scott J. Sugarman

[57] ABSTRACT

A conical stage lens which receives and emits parallel rays of light and which can be used singly to produce magnified images and concentrated beams or in series to produce multiple magnified images and multiple concentrated beams. The stage lens consists of four component lenses, each with a refractive section (face) which widens the beam by 473 percent, this being the means by which enlargement of the object is accomplished.

When used as a microscopic lens, a lower component lens splits the image from the object into a wide annular image. Two middle component lenses refract the annular image outward, and a reflective cylindrical section forming the outer wall of the second middle component lens reflects the image inward to the upper component lens, where it is refracted a fourth time and emitted parallel to the incipient beam from the object.

1 Claim, 3 Drawing Figures

CONICAL WIDE-FIELD MICROSCOPIC LENS

BACKGROUND

Five conical lenses have been disclosed by this inventor. They can be distinguished from one another by the following code in which letters of the alphabet are used to denote the major characteristics:

M - Magnifying lens
R - Refracting section
L - Reflecting section
T - Transmitting section, non-refracting
C - Concentrating lens The five conical lenses with their code designations are as follows:

1. Conical Split-Image Microscopic Lens, M:RR-RR-RT:C, U.S. Pat. No. 4,277,148, July 7, 1981. The code letters mean that the lens can be used as a magnifier (M), that it has two component lenses which refract the image twice (RR-RR), that it has one component lens which refracts and transmits the image (RT), and that the lens can be used as a beam concentrator (C).

2. Reflective Beam Concentrator, RT-L:C, U.S. Pat. No. 4,325,612, Apr. 20, 1982. This lens has a conical mirror which takes in an annular solar beam, so it cannot be used as a magnifier or in multiple stages.

3. Conical Beam Concentrator, M:RR-RT:C, U.S. Pat. No. 4,333,713, June 8, 1982. The lower and upper component lenses of this lens and the disclosure are similar.

4. Monochromatic Beam Concentrator, RR-RR-RT:CM, application Ser. No. 358,468, filed 3/15/82.

5. Conical Wide-Field Microscopic Lens, M:RT-RT-RLT-RT:C, application Ser. No. 350,242, filed 2/19/82.

As to prior art by other inventors, there are no conical lenses which receive and emit parallel whole beams, which are the essential characteristics by which multiple magnification and multiple concentration are achieved.

SUMMARY

Conical optics is a new field which has great potential both in the magnification of objects and the concentration of beams. Extremely high magnifications and concentrations can be achieved in conical optics by the use of multiple stages. By comparison, the maximum magnification that can be achieved in spherical optics is about $1200\times$.

Spherical lenses cannot produce the parallel beams which are essential for multiple beam concentration of high intensity. A conical wide-field stage lens, however, with a reduction in size of 0.002 $1/\times$, will reduce a 500 mm beam to 1 mm,ich are the dimensions produced by the disclosure. The heat of this beam can be imagined by considering the intensity (area of incipient beam/area of concentrated beam), which is 250,126. A beam concentrator of this power cannot be exposed to direct sunlight without melting the lower component lens. It can be exposed to illumination of the open sky, which means that it can be fixed in place and thereby eliminate the need of tracking devices, or the diameter of the concentrated beam can be increased for use with direct sunlight.

Conical optics introduces yet another innovation, this being the wide field of view. The field of view of 500 mm of the disclosure is the actual planar surface of the upper component lens through which the enlarged image is emitted. The microscope using a lens of this size is mounted horizontally and viewed from a distance of six feet or more. It is ideal for group viewing, such as in the classroom. Smaller models with fields of view of 100 mm or less can be designed for use on tables or desks.

DRAWINGS

DESCRIPTION

Figure 1:
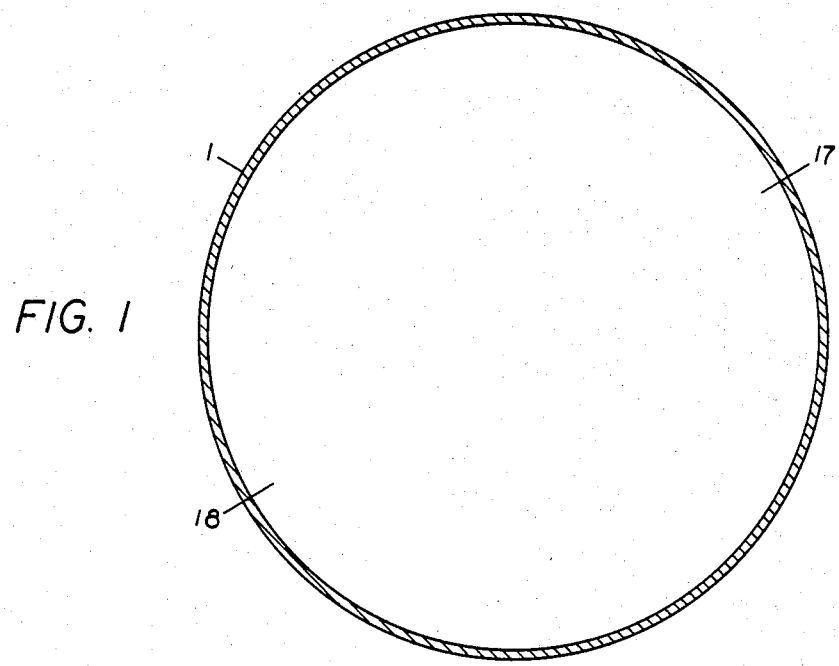
FIG. 1 is a cross section taken on line 1—1 of FIG. 2 and showing the field of view of the magnified image.
Figure 2:
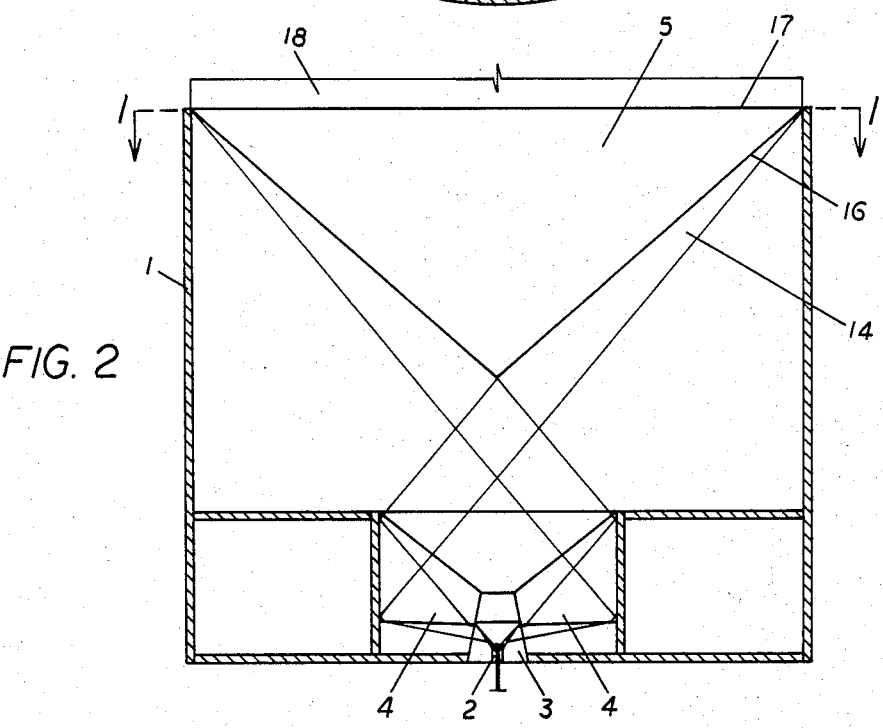
FIG. 2 is an elevation of the wide-field stage lens with ray diagram.
Figure 3:
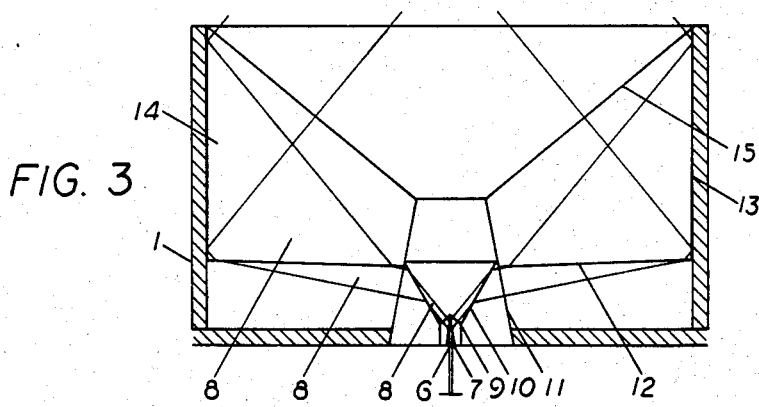
FIG. 3 is an enlarged view of the lower and middle component lenses shown in FIG. 2.

The wide-field microscopic lens has four component lenses mounted in casing 1, as shown in FIG. 2, with each lens being aligned on the optic axis, which is the vertical conical axis. These are lower component lens RT 2, first middle component lens RT 3, second middle component lens RLT 4, and upper component lens RT 5. The beams are refracted upon entering each lens and emitted in a straight line, as indicated by the code letters. The second middle component lens RLT 4 refracts, reflects and transmits the beam.

The passage of the beams through the lenses is as follows: Incident beam 6 is refracted by concave section (face) 7 of lower component lens RT 2 and split into conical beam 8 which is emitted through convex section 9. Conical beam 8 is refracted by concave section 10 of first middle component lens RT 3 and emitted by convex section 11, and then refracted by convex section 12 of second middle component lens RLT 4, reflected inward by reflective cylindrical section 13, forming conical beam 14 which is emitted by concave section 15. Conical beam 14 is refracted by convex section 16 of upper component lens RT 5 and emitted by planar section 17 as whole beam 18 which is parallel to the optic axis.

The angles of incidence and refraction of the refracting section of each component lens is 80.75° and 41.15°. Each refraction widens the beam by 473 percent, which produces a total magnification of $500\times$ (image beam diameter 1 mm $\times 4.73^{4\ 500}\times$). The angle of reflection of reflective cylindrical section 13 is 50.5°.

The wide-field microscopic lens is intended to be used in a multiple-stage microscope. It is to be mounted above two 72° segments of conical lens M:RT-RT:C (Conical Beam Concentrator, Ser. No. 260,583 now U.S. Pat. No. 4,325,612). Segment lenses are longitudinal segments of whole lenses. They can be rotated into and out of the line of vision to produce variable powers of magnification, as disclosed in Quadrant Conical-Lens Microscope, application Ser. No. 291,174, filed Aug. 10, 1981. Using two M:RT-RT:C segment lenses with a magnification of $40\times$, the following total magnifications will be possible:

| Stage | Lenses M:RT-RT:C | Stage | Lens M:RT-RT-RLT-RT:C | | Total Magnification |
|---|---|---|---|---|---|
|  |  | 3rd | 500× | = | 500× |
| 1st | 40× | 3rd | 500× | = | 20,000× |
| 1st & 2nd | 1600× | 3rd | 500× | = | 800,000× |

A disadvantage of using multiple stages is that there is the problem of light penetration arising from the large number of lens surfaces encountered by the beams. There will be a total of seventeen surfaces encountered to produce the 800,000× image, which will be used primarily to study atomic and molecular configurations. The problem is complicated by the small area of the incipient image beam, which is only 0.785 mm².

The problem of poor light penetration will be eliminated by using the Concentrated-Beam Illuminator For Microscopes as disclosed in a copending application. This illuminator has an incandescent bulb and two beam concentrators and mirrors mounted in the base of the microscope. It can produce the low intensity of a 50 mm beam emitted by the bulb, high intensity of the beam reduced to 10 mm by one concentrator, and very high intensity of the beam reduced to 2 mm by both concentrators.

I claim:

1. A conical wide-field microscopic lens comprising four component lenses (2,3,4,5), with each component lens having one or two conical sections with surfaces which refract light rays at prescribed angles, with all conical sections of the components lenses being aligned on a common axis which is parallel to the incident rays entering and the refracted rays emanating from the microscopic lens, with all surfaces of the component lenses not used for refraction, reflection and transmission of light rays being opaque, and with the four component lenses as described below:

(a) lower component lens RT (2) positioned above the object and having a concave conical section (7) which receives and refracts incident beam (6) outward from the common axis at the prescribed angle, forming conical beam (8), and having a convex conical section (9) normal to the direction of propagation of conical beam (8) so as to receive and emit conical beam (8) without refraction, (b) first middle component lens RT (3) above and adjacent to lower component lens RT (2) and having a concave conical section (10) which receives and refracts conical beam (8) outward from the common axis at the prescribed angle, and having a convex conical section (11) normal to the direction of propagation of conical beam (8) so as to receive and emit conical beam (8) without refraction, (c) second middle component lens RLT (4) above and adjacent to first middle component lens RT (3) and having a convex conical section (12) which receives and refracts conical beam (8) outward from the common axis at the prescribed angle, and having a reflective cylindrical section (13) which receives and reflects conical beam (8) in toward the common axis at the prescribed angle, forming conical beam (14), and having a concave conical section (15) normal to the direction of propagation of conical beam (14) so as to receive and emit conical beam (14) without refraction, and (d) upper component lens RT (5) above and adjacent to second middle component lens RT (4) and having a convex conical section (16) which receives and refracts conical beam (14) parallel to the common axis at the prescribed angle, and having a planar section (17) normal to the direction of propagation of conical beam (14) so as to emit conical beam (14) without refraction, forming whole beam (18) which is parallel to the common axis and parallel to incident beam (6).

* * * * *